UNITED STATES PATENT OFFICE.

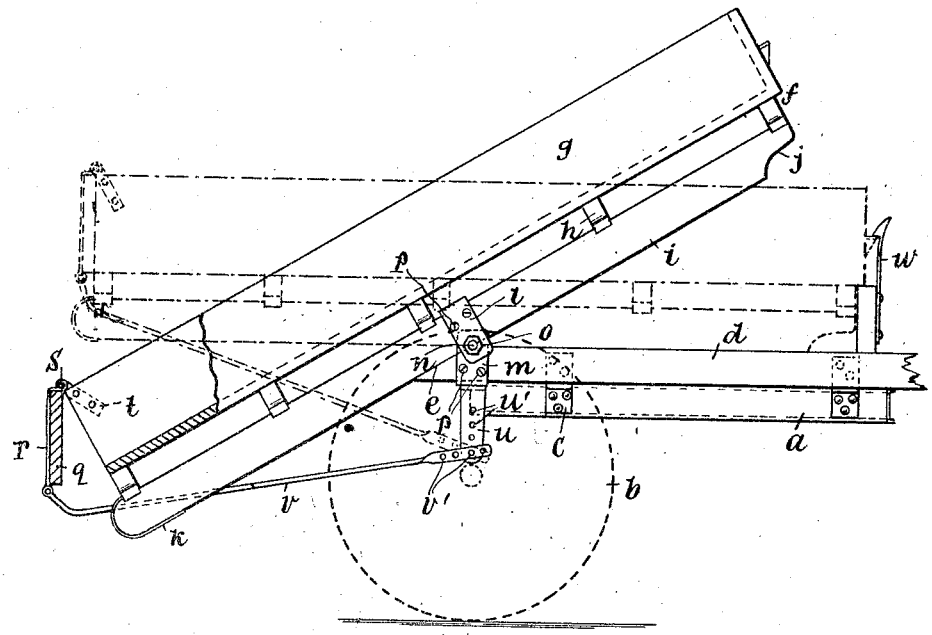
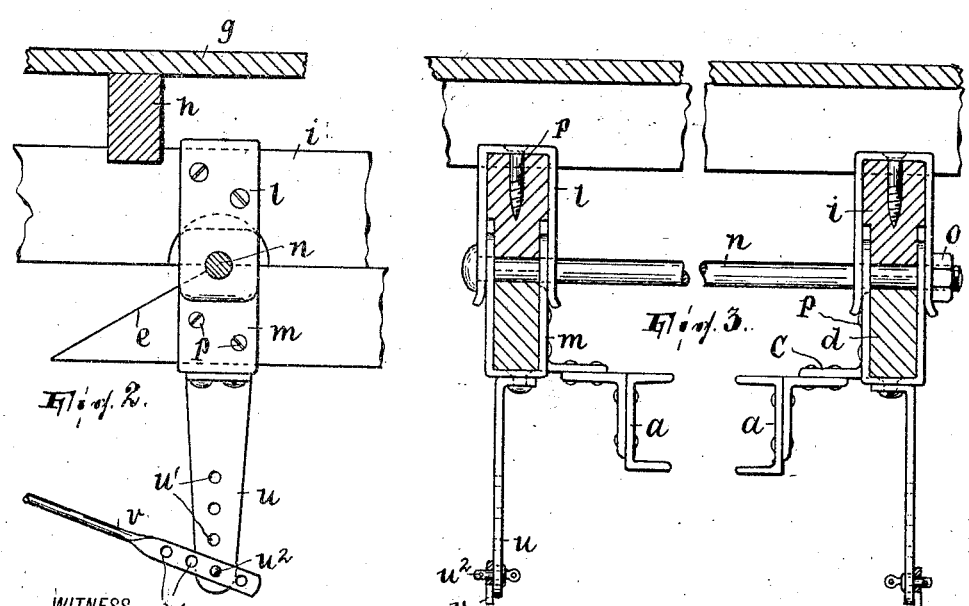

FRANK B. RAYMOND, OF PORT JERVIS, NEW YORK.

VEHICLE DUMPING-BODY.

1,288,678.    Specification of Letters Patent.    Patented Dec. 24, 1918.

Application filed October 1, 1917. Serial No. 194,108.

*To all whom it may concern:*

Be it known that I, FRANK B. RAYMOND, a citizen of the United States, residing at Port Jervis, in the county of Orange and State of New York, have invented certain new and useful Improvements in Vehicle Dumping-Bodies, of which the following is a specification.

In devising the present improvements in dumping-body vehicles I have had in mind to produce a construction that would be simple and inexpensive, yet exceedingly strong and durable, and that further could be operated with the greatest facility and without the driver leaving his position on the vehicle. My improvements are particularly adapted to be incorporated in a structure to be fitted to the chassis of an ordinary Ford automobile and are so illustrated and described herein. According to one part of my invention in its preferred form there is a horizontal framing structure above which the dumping body structure is arranged, said structure including superposed longitudinal sills (say, two each) of which those of the body structure project beyond the rear ends of those of the framing structure, and a hinge connection between the sills is produced by hinge members in the form of straps embracing the sills and a bolt or other pivot connecting said hinge members. By utilizing straps for the hinge members and making them embrace the sills, the latter are greatly reinforced against the strains and shocks incident to the dumping and return movements of the body, and in addition the hinge itself is strong and simple and readily disconnected if need be. According to another part of my invention the body has a tail gate and this is connected with the member of said hinge-connection which is on one of the sills of the framing structure by a link so that when the body is in normal position the gate will be held closed, but when the body tilts in the act of dumping the tail gate will be automatically moved to the open position; further, the extent to which the gate is moved is made variable so that with the vehicle in motion the load may be spread to any depth.

In the accompanying drawing,

Figure 1 is a side elevation of my invention, certain parts appearing in section;

Fig. 2 is a longitudinal sectional view illustrating principally the hinge-connection; and Fig. 3 is a transverse sectional view also illustrating principally the hinge-connection.

*a* indicates the frame and *b* the rear wheel of an ordinary Ford chassis.

By means of brackets *c* there are secured to the longitudinal members or sides of this frame the sills *d*, which as shown are formed of wood but may of course be formed of metal. These extend longitudinally, *i. e.*, parallel with the said frame sides, and they have their rear ends beveled rearwardly and downwardly in the same plane, as at *e*, for a purpose to be explained.

*f* designates the body, the same including in the present instance a simple form of box *g*, cross-pieces *h* on which the box is arranged and rigidly secured, and longitudinal sills *i* on which the cross-pieces rest and are rigidly secured.

The sills in the normal position of the body respectively rest on the sills *d* of the frame, the position of the body with reference to the latter sills being preferably such that the middle of the body will be about coincident with the apex of the angle formed by the top of each sill *d* and its beveled face *e*, whereby it will require the minimum of effort to move the body in dumping or returning it to normal position. The front ends of the sills *i* may be cut away, as at *j*, to afford a hand-hold, and their rear ends may be shod with metal strips *k* to protect them, though, as will be explained, usually the rear of the body will not come against the ground in dumping in the preferred form of the invention.

The hinge-connections are formed as follows: Each consists of an upper U-shaped metal strap *l* and a lower U-shaped metal strap *m* projecting relatively reversely and having the ends of the latter fitted between the ends of the former, and a bolt *n* penetrating their ends and equipped with a nut *o*. The straps *l* and *m* respectively embrace the sills *i* and *d*, as shown best in Fig. 3. Preferably but one bolt is employed as the pivot for both hinge connections, and it is so arranged that its axis is coincident with the summit of the bevel, that is, the apex of the angle formed by the top face of each sill *d* and its beveled face *e*. The straps forming the hinge-members may be secured to the sills by screws $p$.

The arrangement described is not only simple and inexpensive, permitting a Ford chassis or other suitable vehicle frame to be readily fitted with a dumping body and also permitting such body to be readily removed from and reassembled with the chassis or frame, but it affords an exceedingly strong and durable construction. When the body moves to dumping position it comes to rest with its sills $i$ abutting the beveled faces of the sills $d$, and the construction of the hinge-connections and their relation to the sills $d$ and $i$ are obviously such that in themselves they are well adapted to withstand the dumping movement of the body being thus checked, while they substantially reinforce the sills. It will be noted that because the axis of the bolt $n$ is coincident with the summit of the bevel $e$, the weight of the body is supported in any position thereof rather by the sills $d$ than by the bolt $n$.

The box $g$ of the body has a tail gate $q$. This has vertical straps $r$ whose upper ends form eyes receiving a pivot pin $s$ arranged in brackets $t$ attached to the sides of said box $g$. A bracket $u$ may be riveted to one (or each) of the hinge-members $m$, and connecting such bracket with one of the straps $r$ at the lower end of the later is a link $v$. The link is of such length that when the body $f$ is in normal position (dotted lines, Fig. 1) it holds the gate closed. When the body moves to the dumping position the link swings the gate open in an obvious manner (full lines, Fig. 1).

The brackets $u$ may have a series of holes $u'$ to receive a pin or bolt $u^2$ adjustable in holes $v'$ in link $v$ whereby, the extent of opening movement of the gate can be varied, by changing the position of the pin in the holes, so that with the vehicle in motion the load may be distributed to any desired depth over the ground.

The body $f$ may be held in the normal position by the latch $w$, readily accessible to the driver.

Having thus fully described my invention, what I claim and desire to secure by Letters Patent is:

1. In combination, a framing structure, a dumping body structure arranged upon the framing structure and projecting beyond the same, one of said structures including a longitudinal sill, and a hinge-connection between said structures including hinge members and a transverse pivot connecting them, one of said members being a strap extending around the sill and having its ends projecting relatively toward the other structure and receiving the pivot.

2. In combination, a framing structure having a longitudinal sill, a dumping body structure arranged upon the framing structure and having a longitudinal sill above and projecting beyond the first-named sill, and a hinge-connection between said structures including hinge members in the form of straps, each extending around the sill of one structure and having its ends projecting relatively toward the other structure, and a transverse pivot in said ends of said straps.

3. In combination, a framing structure having a longitudinal sill, a dumping body structure also having a longitudinal sill normally resting in substantially face to face contact with the first sill, the first sill having one end extending short of the other sill and beveled downwardly and thereby forming a bevel face with which the other sill is movable into substantially face to face contact, and a hinge-connection between said sills including hinge members secured thereto and a pivot joining said members and having its pivot axis coincident with the summit of said bevel.

In testimony whereof I affix my signature.

F. B. RAYMOND.